United States Patent [19]

Michalko

[11] 3,714,071

[45] Jan. 30, 1973

[54] LOW DENSITY ALUMINA SPHERES OF IMPROVED STRENGTH AT HIGH TEMPERATURE

[75] Inventor: Edward Michalko, Lombard, Ill.

[73] Assignee: Universal Oil Products Company, Des Plaines, Ill.

[22] Filed: March 18, 1970

[21] Appl. No.: 20,808

[52] U.S. Cl....................................252/448, 252/462
[51] Int. Cl...........................B01j 11/32, B01j 11/44
[58] Field of Search.............................252/448, 462

[56] References Cited

UNITED STATES PATENTS

| 2,620,314 | 12/1952 | Hoekstra | 252/448 |
| 2,435,379 | 2/1948 | Archibald | 252/448 |
| 2,450,394 | 9/1948 | Brown | 252/448 |
| 3,202,480 | 8/1965 | Nixon | 23/143 |
| 3,024,199 | 3/1962 | Pasfield | 252/313 |
| 3,453,331 | 4/1969 | Hargis | 260/593 |

Primary Examiner—Daniel E. Wyman
Assistant Examiner—W. J. Shine
Attorney—James R. Hoatson, Jr. and Robert W. Welch

[57] ABSTRACT

Low density alumina spheres of improved strength at high temperature are prepared by commingling an acidic alumina sol and an aqueous rare earth metal salt solution with an ammonia precursor at below gelation temperature and dispersing the mixture as droplets in a hot oil bath. The hydrogel spheres which form are aged, washed and dried, and calcined. Low density alumina spheres are useful as a catalyst or as a catalyst support, particularly in the conversion of hot exhaust gases from an internal combustion engine.

11 Claims, No Drawings

LOW DENSITY ALUMINA SPHERES OF IMPROVED STRENGTH AT HIGH TEMPERATURE

It is generally recognized that catalysis is a mechanism not fully understood and in many cases unpredictable with respect to catalyst activity, stability, and the like. Minor variations in physical characteristics and/or composition of a catalyst may provide unexpected and substantial differences in efficiency or usefulness in connection with the particular conversion reaction. It has heretofore been observed that low density alumina spheres which have been composited with one or more catalytically active metallic components provide improved oxidation catalyst for the treatment and conversion of noxious components of exhaust gases of internal combustion engines. Catalysts comprising higher density alumina spheres, even though composited with identical catalytically active metallic components, are less stable and tend to deactivate at a faster rate — especially when utilized for the treatment of exhaust gases from an internal combustion engine operating on a leaded fuel. It will be appreciated that the catalyst particles must in any case be sufficiently durable at high temperature to withstand a certain amount of buffeting without excessive breakage. However, when exposed to the extremely high temperatures typical of exhaust gases discharged from an internal combustion engine, those catalysts comprising low density alumina spheres are somewhat more susceptable to loss of strength than is the case with catalyst comprising high density alumina spheres.

It is an object of this invention to provide low density alumina spheres of improved strength at high temperature. It is a further object to provide a method of preparation whereby low density alumina spheres of improved strength at high temperature are manufactured by the relatively simple procedure of adding a rare earth metal salt or salts to an alumina sol prior to gelation, the hydrogel product being subsequently washed, dried and calcined.

In one of its broad aspects, the present invention embodies a method for producing low density alumina spheres of improved strength at high temperature which comprises commingling an acidic alumina hydrosol and an aqueous rare earth metal salt solution with an ammonia precursor at below gelation temperature, said ammonia precursor being decomposable to ammonia with increasing temperature, and forming a mixture with an aluminum/ acid anion ration of from about 1.0 to about 1.5; dispersing the resulting mixture as droplets in a hot oil bath effecting decomposition of said ammonia precursor and formation of hydrogel spheres therein; aging the hydrogel spheres at an elevated temperature effecting decomposition of the residual ammonia precursor contained therein, and washing, drying and calcining the aged hydrogel spheres.

One of the more specific embodiments relates to a method for producing low density alumina spheres of improved strength at high temperature which comprises commingling an aluminum chloride hydrosol and an aqueous rare earth metal chloride salt solution with hexamethylenetetramine at below gelation temperature and forming a mixture with an aluminum/chloride ratio of from about 1.0 to about 1.5, the hexamethylenetetramine being utilized in an amount to effect substantially complete neutralization of the chloride anion, and the rare earth metal salt solution being utilized in an amount to provide a final product comprising from about 5 to about 15 wt. percent rare earth metal oxide; dispersing the mixture as droplets in an oil bath maintained at from about 120° to about 220° F. and forming hydrogel spheres; aging the hydrogel spheres at a temperature of from about 120° to about 500° F. and at a pressure to maintain the water content thereof in a substantially liquid phase, and washing, drying and calcining the aged hydrogel spheres at a temperature of from about 800° to about 1,400° F.

Other objects and embodiments of this invention will become apparent in the following detailed specification.

Low density alumina spheres are suitably prepared from an alumina hydrosol by the oil-drop method substantially as described by J. Hoekstra in U.S. Pat. No. 2,620,314. Briefly, the method comprises commingling an alumina sol and a gelling agent at below gelation temperature and dispersing the mixture as droplets into a water-immiscible suspending medium, usually a gas oil, maintained at an elevated temperature whereby gelation occurs and the droplets formed into firm spherical hydrogel particles. The particles are thereafter subjected to one or more aging treatments whereby certain desirable physical characteristics are imparted thereto. However, the Hoekstra reference does not provide a teaching of the present invention which embodies the addition of a rare earth metal salt to the alumina hydrosol prior to the formation of spherical hydrogel particles in accordance with said oil-drop method. IN this manner, alumina spheres of improved strength at high temperatures are produced.

Thus, pursuant to the method of the present invention, an acidic alumina hydrosol is admixed with sufficient rare earth metal salt to yield a final product comprising from about 2 to about 20 wt. percent rare earth metal oxide, and preferably from about 5 to about 15 wt. percent, and the mixture dispersed as droplets in a hot oil bath, preferably maintained at a temperature of from about 120° to about 220° F., whereby gelation occurs with the formation of spherical gel particles. The acidic alumina hydrosol is preferably an aluminum chloride hydrosol suitably prepared by digesting aluminum turnings, slugs or pellets in aqueous hydrochloric acid and/or aluminum chloride solution. The aqueous rare earth metal salt solution may comprise a salt of one or more of the rare earth metals, said metals including cerium, lanthanum, praseodymium, neodymium, illinium, samarium europium, gadolinium, terbium, dysprosium, holmium, erbium, thulium, scandium, yttrium, lutechium, etc. A wide variety of rare earth metal salts can be employed, the sole limitation being that the selected salt or salts be sufficiently soluble in aqueous media. The rare earth metal chlorides and nitrates are particularly suitable. It is a convenient and preferred practice to utilize the rare earth metal salt solutions which are commercially available. Said solutions generally comprise a mixture of chlorides, principally cerium, lanthanum, neodymium, and praseodymium chlorides together with minor amounts of samarium, gadolinium and yttrium chlorides.

In this type of operation, the hydrosol, including the aforesaid rare earth metal salt, is set to a gel utilizing ammonia as a neutralizing or setting agent. The ammonia is derived from an ammonia precursor. The ammonia precursor is preferably hexamethylenetetramine although other weakly basic materials, including urea alone or in combination with hexamethylenetetramine, which are substantially stable at below gelation temperature but hydrolyzable to ammonia with increasing temperature, may be employed. The hexamethylenetetramine, or other ammonia precursor, is utilized in an amount sufficient to effect substantially complete neutralization of the chloride or other acidic anion contained in the hydrosol upon total hydrolysis. Preferably hexamethylenetetramine is utilized in an amount equivalent to from about a 1:4 to about 1.25:4 mole ratio with said chloride. The hexamethylenetetramine is preferably separately prepared in aqueous solution and thereafter commingled with the alumina hydrosol and rare earth metal salt. The hexamethylenetetramine aqueous solution suitably comprises from about 28 to about 40 wt. percent hexamethylenetetramine.

Only a fraction of the ammonia precursor is hydrolyzed or decomposed to ammonia in the relatively short period during which initial gelation occurs. During the subsequent aging process, the residual ammonia precursor retained in the spherical gel particles continues to hydrolyze and effect further polymerization of the alumina whereby pore characteristics of the product are established. The spherical gel particles are aged, preferably in the alkaline oil bath, at a temperature of from about 120° to about 500° F. and at a pressure to maintain the water content of said particles in a substantially liquid phase. Preferably, the gel particles are aged at a temperature of from about 120° to about 350° F. and at a pressure of from about 40 to about 150 psig. whereby the water content of the particles is maintained in a substantially liquid phase. The spheroidal particles are suitably aged at the described conditions of temperature and pressure within the period of from about 1 to about 5 hours.

After the aging treatment, the spheres are washed in any suitable manner. A particularly satisfactory method is to wash the spheres by percolation, either with an upward or downward flow of water, and preferably with water containing a small amount of ammonium hydroxide and/or ammonium nitrate. After washing, the spheres may be dried at a temperature of from about 200° to about 600° F. for 2 to 24 hours or more, or dried at this temperature and calcined at a temperature of from about 800° to about 1400° for 2 to 12 hours or more, and utilized as such or composited with other catalytic components. It is preferred that the spheres be dried slowly and also that the drying be effected in a humid atmosphere since this has been found to result in less breakage of the spheres.

The described oil-drop method affords a convenient means of developing the desired density characteristics of the spherical gel product. Thus, the method includes a number of process variables which effect the physical properties of the spherical alumina particles. Generally, the aluminum/chloride ratio of the hydrosol will influence the average bulk density of the particles and, correspondingly, the pore volume and pore diameter characteristics attendant therewith, higher ratios tending toward lower average bulk densities. The low density alumina spheres herein contemplated, i.e. less than about 0.5 gms/cc., are produced with aluminum/chloride ratios of from about 1.0 to about 1.5. Other process variables affecting physical properties include the time, temperature and pH at which the particles are aged. Surface area properties are normally a function of calcination temperature.

In the conversion of exhaust gases from an internal combustion engine, other catalytic components are advantageously employed in conjunction with the low density spherical alumina particles of this invention to realize a catalyst composition of improved strength at high temperature. Other catalytic components include the oxides of metals of groups IB, VIB and VIII of the Periodic Table. Said catalytic components thus include the oxides of chromium, molybdenum, tungsten, iron, nickel, cobalt, platinum, palladium, rhodium, ruthenium, iridium, osmium, copper, and the like. It is understood that, although improved catalyst strength is realized at high temperature, the activity, stability, auto-initiating temperature, lead susceptibility and other characteristics of the various catalytic components are not necessary equivalent.

In the conversion of exhaust gases from an internal combustion engine, the catalyst composition is conveniently placed in a suitable container or catalytic converter may be of the through-flow, cross-flow or radial-flow design and may supplant or be combined with the conventional acoustic muffler. The injection of supplemental air ahead of the converter inlet, generally by means of an aspirator or an external compresser, may or may not be required depending on the engine operating conditions and/or the particular catalytic components employed.

The following examples are presented in illustration of the method of this invention and are not intended as an undue limitation on the generally broad scope of the invention as set out in the appended claims.

EXAMPLE I

About 1200 cc. of an aluminum chloride hydrosol, 140 cc. of an aqueous rare earth metal chloride solution, 51 cc. of concentrated hydrochloric acid and 105 cc. of water were blended together. The aluminum chloride hydrosol contained 13.96 wt. percent aluminum and 9.83 wt. percent chloride. The aqueous rare earth metal chloride solution contained 10.7 wt. percent cerium, 7.4 wt. percent lanthanum, 2.8 wt. percent neodymium and 0.91 wt. percent praseodymium. About 750 cc. of the resulting blend was then admixed with 750 cc. of a 28 wt. percent aqueous hexamethylenetetramine solution and the mixture emitted as droplets into a forming tower filled with a gas oil suspending medium maintained at about 194° F. Spheroidal hydrogel particles were recovered from the bottom of the tower and aged in a portion of the oil suspending medium in a separate vessel for a period of from about 70 minutes at a temperature of 300° F. and at a pressure of 60 psig. The aged spheres were thereafter washed with a flow of water at about 205° F. for 2 hours. The spheres were then recovered, dried and calcined for 2 hours at 1200° F. The spheroidal alumina product had an average bulk density of about 0.25 grams per cubic centimeter. Analyses indicated 5.0 wt. percent cerium, 3.4 wt. percent lanthanum, 1.1 wt. percent neodymium, and 0.4 wt. percent praseodymium, for a total rare earth metal content of 9.9 wt. percent — equivalent to a total rear earth metal oxide content of about 11.6 wt. percent.

The spheres thus produced were subjected to a standard test procedure to determine crushing strength. The average crushing strength of the alumina spheres was determined as the arithmetic average of the force required to crush each particle of a given number of individual particles. Each particle was crushed in an apparatus constructed in such a manner that the force was supplied continuously and at a uniform rate beginning with a zero load. The crushing strength apparatus consists essentially of a balance beam resting on a knife edge. The knife edge is located at unit distance from an anvil on which the alumina particle is placed. A cup, which received lead shot by which the load is supplied, is situated on the other side of the knife edge four times the unit distance therefrom. This lead shot falls into this cup from a copper at a rate of about 9 pounds per minute, thus loading the alumina particles at a rate of about 36 pounds per minute. A single particle is placed on the anvil of the apparatus, and the beam balance by means of a small spirit level. Force is applied to the particle by opening the shutter in the bottom of the hopper containing the lead shot, thus allowing the lead to flow in a continuous stream into the cup. The flow of lead shot is immediately and automatically cut off when the particle is completely crushed. The weight of lead shot within the cup is multipled by a factor of 4 to give the actual crushing strength of the particle. The procedure is repeated 60 times and the crushing is taken as the arithmetic average of the observed individual crushing strengths. The spheroidal alumina particles prepared as above described had an average crushing strength of 8.0 pounds.

About 10 grams of the spheroidal alumina particles were thereafter immersed in 45 cc. of an aqueous molybdic acid solution comprising 1.41 grams of 85 percent $MoO_3$ and 1 cc. of 28 percent $NH_4OH$, and the solution thereafter evaporated to dryness in a rotary steam dryer. The dried particles were then heat treated at 1,500° F. for 2 hours. Prior to heat treatment the spheroidal particles had an average crushing strength of 8.0 pounds, and subsequent to the heat treatment the average crushing strength was 6.1 pounds.

EXAMPLE II

In this example, one-eighth inch alumina spheres were prepared substantially as described except that the rare earth metal salt addition was omitted. The alumina spheres were impregnated and heat treated as in Example I. Prior to the heat treatment the spheres had an average crushing strength of 10.1 pounds. Subsequent to the heat treatment the average crushing strength had deteriorated to less than 1 pound.

I claim as my invention:

1. A method for producing low density alumina spheres of improved strength at high temperature which comprises:
   1. commingling an acidic alumina hydrosol and an aqueous rare earth metal salt solution with an ammonia precursor at below gelation temperature, said ammonia precursor being decomposable to ammonia with increasing temperature and said rare earth metal salt solution being sufficient to yield a final product comprising from about 2 to about 20 wt. percent rare earth metal oxide, and forming a mixture with an aluminum/acid anion ratio of from about 1.0 to about 1.5;
   2. dispersing the resulting mixture as droplets in a hot oil bath effecting decomposition of said ammonia precursor and formation of hydrogel spheres therein;
   3. aging the hydrogel spheres at an elevated temperature effecting decomposition of the residual ammonia precursor contained therein, and washing, drying and calcining the aged hydrogel spheres.

2. The method of claim 1 further characterized in that said acidic alumina hydrosol is commingled with sufficient rare earth metal salt to yield a final product comprising from about 5 to about 15 wt. percent rare earth metal oxide.

3. The method of claim 2, further characterized in that said aqueous rare earth metal salt solution is an aqueous rare earth metal chloride solution.

4. The method of claim 3 further characterized in that said ammonia precursor is hexamethylenetetramine.

5. The method of claim 4 further characterized in that said hexamethylenetetramine is utilized in an amount to effect substantially complete neutralization of the chloride anion contained in said mixture.

6. The method of claim 5 further characterized in that said hexamethylenetetramine is utilized in from about a 1:4 to about a 1.25:4 mole ratio with said chloride anion.

7. The method of claim 6 further characterized in that said oil bath is maintained at a temperature of from about 120° to about 220° F.

8. The method of claim 7 further characterized in that said hydrogel spheres are aged at a temperature of from about 120° to about 500° F. and at a pressure to maintain the water content thereof in a substantially liquid phase.

9. The method of claim 8 further characterized in that sad hydrogel spheres are aged at a temperature of from about 120° to about 350° F. and at a pressure of from about 40 to about 150 psig.

10. The method of claim 9 further characterized in that said aged hydrogel spheres are dried and calcined at a temperature of from about 800° to about 1,400° F.

11. The method of claim 10 further characterized in that said aqueous rare earth metal chloride solution comprises lanthanum, praseodymium, and neodymium chlorides.

* * * * *